Figure 1:
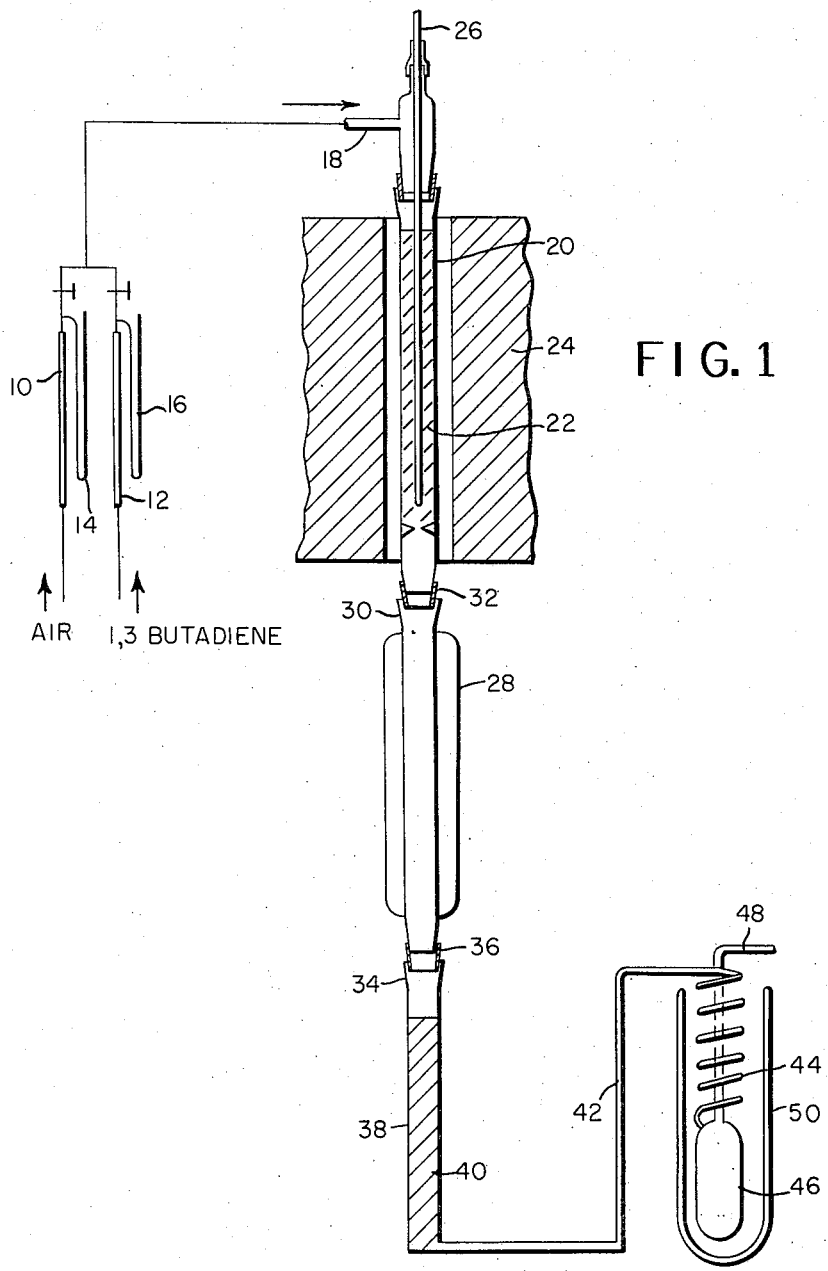

INVENTOR
JOHN RUFFORD HARRISON

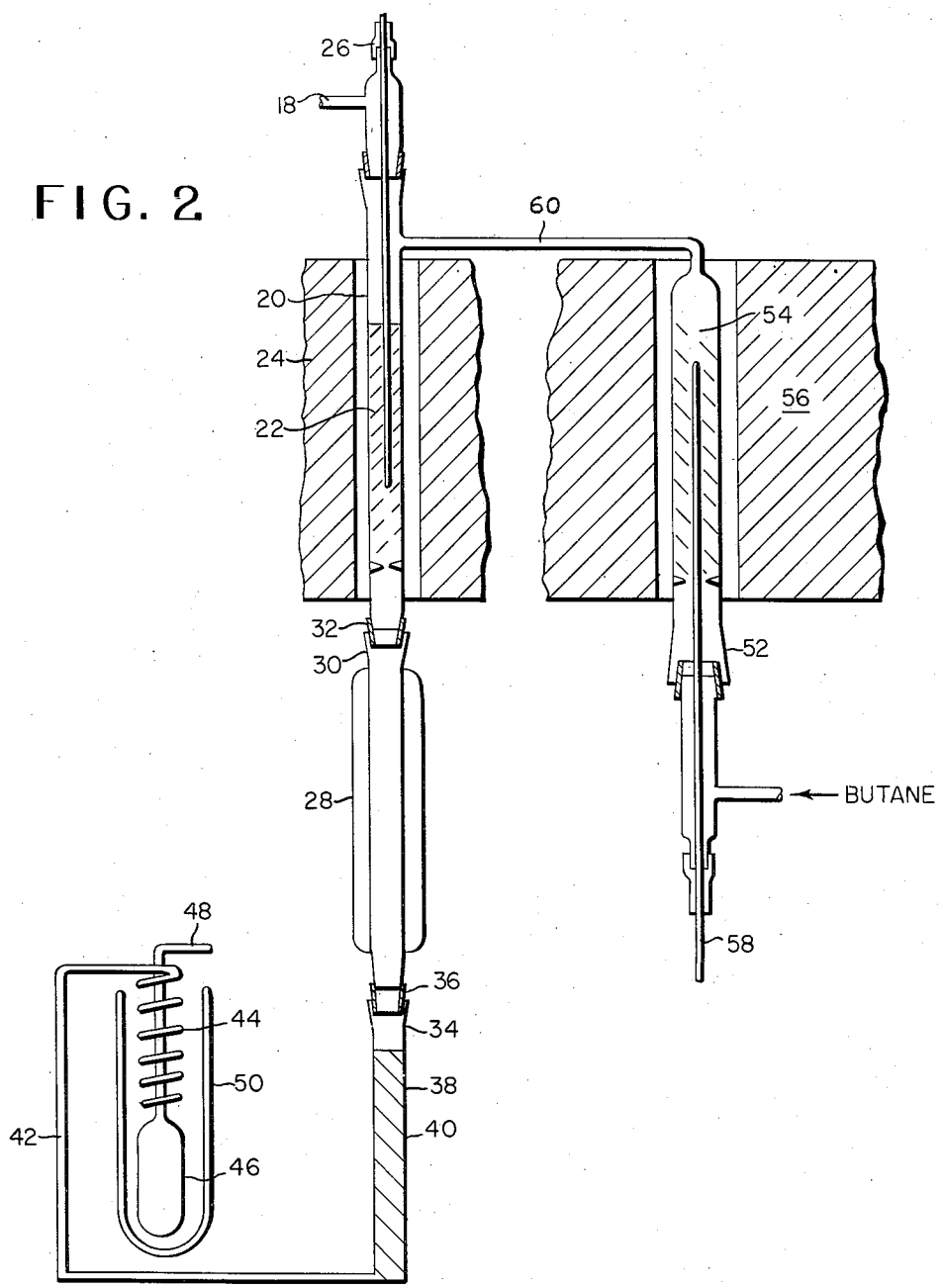

United States Patent Office 2,900,396
Patented Aug. 18, 1959

2,900,396

OXIDATION OF 1,3 BUTADIENE TO FURAN

John Rufford Harrison, Newark, Del., assignor to E. I. du Pont de Nemours and Company, Wilmington, Del., a corporation of Delaware Application October 1, 1957, Serial No. 687,554

7 Claims. (Cl. 260—346.1)

This invention relates to a process for producing furan, and is more particularly concerned with the production of furan by oxidation of 1,3-butadiene or hydrocarbon vapors containing 1,3-butadiene.

Furan is an important chemical intermediate, employed commercially on a large scale. It has been produced from furfural, which is derived from corncobs and other pentosan-containing vegetable materials.

It is an object of this invention to provide a process for producing furan from hydrocarbons. Other objects will become apparent from the specification and claims.

In accordance with this invention it has been found that furan is produced by a catalytic partial oxidation of 1,3-butadiene vapor at 250°–550° C. in the presence of a catalyst of the empirical formula, $(MnO)_nMO_3$, where $n$ is from zero to approximately unity and M is a metal of group VI of the periodic system. Suitable catalysts of this class include tungsten (VI) oxide $(WO_3)$, molybdenum (VI) oxide $(MoO_3)$ and manganous molybdate $(MnMoO_4)$.

The catalyst will supply the oxygen required until it is reduced, and can then be reoxidized with air. Reduction of the catalyst is avoided by mixing air with the butadiene, preferably in sufficient dilution with inert gas or an excess of butadiene to dissipate the heat of reaction so that the desired partial oxidation of butadiene to furan takes place rather than a complete combustion. The 1,3-butadiene is readily formed by cracking hydrocarbon gas, such as butane or butenes, and the cracked gas can be reacted directly without separating the butadiene from the other products obtained in the cracking process, which help in removing heat of reaction as mentioned above.

In continuous operation a mixture of gas containing air and 1,3-butadiene in a ratio between 24:1 and 1:1 is passed through a catalyst bed comprising $MoO_3$ or $WO_3$ or manganous molybdate, at a space velocity of 150 to 85,000 parts by volume of gas per hour per part by volume of catalyst space (calculated for standard temperature and pressure), using suitable means for keeping the maximum temperature in the range from 250° to 550° C., which is most easily accomplished by diluting the air with materials such as nitrogen, steam or cracked hydrocarbons other than butadiene. The preferred conditions are at temperature of 300°–400° C., an air-butadiene ratio of 5:1–12:1 and a space velocity of 150–450 hours⁻¹ (calculated for standard temperature and pressure). When using fresh catalyst the amount of furan formed may increase from a low value during the first 2 to 3 hours, after which the amount becomes constant if other conditions are not altered.

The butadiene is predominantly converted to furan, but the reaction gases will also contain, in addition to unchanged materials, large amounts of water and oxides of carbon, and trace amounts of 4-vinylcyclohexene, crotonaldehyde, acetaldehyde and other oxygenated products. Furan is recovered by condensation from the reaction gases and purified by distillation. Unchanged butadiene and crotonaldehyde are also recovered by condensation. Crotonaldehyde is partially converted to furan under the same conditions as butadiene, so both of these materials can be recycled to increase the yield and need not be isolated from other condensates.

In the drawings, which illustrate suitable apparatus for practicing the process of this invention, Figure 1 is a diagrammatic representation of an apparatus for converting 1,3-butadiene to furan, and Figure 2 is a diagrammatic representation of an apparatus for cracking butane or butene to form 1,3-butadiene and then converting the butadiene to furan.

In Figure 1, air is fed through a rotameter 10 and 1,3-butadiene is fed through a rotameter 12. The rotameters are calibrated to a fixed pressure maintained on manometer 14 for the air stream and manometer 16 for the butadiene stream. When a diluent stream is to be added a third rotameter-manometer combination is used to control the flow. The gas streams are combined and flow through tube 18 into the top of reactor column 20. A catalyst bed 22 is provided in the central part of the reactor column, and this portion of the column is surrounded by a furnace 24 maintained constant within ±10° C. of the required temperature by suitable means. A thermocouple well 26 is provided which extends downward into the catalyst bed, with the sealed lower end near the bottom of the bed. A conventional thermocouple and recording instrument is used to register the temperature in the bed.

The lower end of the reactor column is connected to a water-cooled condenser 28, a suitable connection being provided by a standard-taper joint 30 and polytetrafluoroethylene seal 32. The exit end of the condenser is connected in similar fashion, by a taper joint 34 having a seal 36, to a drying column 38 containing a suitable desiccant 40 for drying the cooled reaction gases. The gases then pass through tube 42 to a low temperature condenser 44 where the condensable products are recovered in trap 46. The non-condensable gases leave the trap by tube 48. The condenser and trap can be cooled by surrounding them with solid carbon dioxide in trichloroethylene contained in insulated vessel 50. The condensed products are separated by fractional distillation and analyzed by conventional procedures.

In the following examples, which illustrate specific embodiments of the invention, volumes of gases refer to volumes calculated for standard temperature and pressure.

Example 1

A 3:1 air:butadiene mixture was passed through the reactor of Figure 1 at a space velocity of 85,000 volumes per hour per volume of catalyst, using a manganous molybdate catalyst bed maintained at about 540° C. Under these conditions only a small fraction of the butadiene reacted with the oxygen present, but the butadiene which did react was largely converted to furan.

Example 2

A catalyst bed of manganous molybdate maintained at 375° C. was used in the reactor of Figure 1. A mixture of 120 parts by volume of air, 120 parts by volume of nitrogen and 10 parts by volume of 1,3-butadiene were passed per minute through 60 parts by volume of catalyst. Under these conditions a high conversion of butadiene to furan was obtained.

In the apparatus of Figure 2 the reactor system of Figure 1 is combined with a butane or butene cracker. Butane is fed into the bottom of cracking column 52 and passes upward through a conventional type of 15% chrome alumina catalyst bed 54. The catalyst bed is surrounded by a furnace 56 maintained at 550°–650° C. A thermocouple well 58 is provided for measuring the bed temperature. The cracked butane products pass from the top of the cracking column through tube 60 and are fed directly into the reactor column described in connection with Figure 1. Air is introduced into the reactor to convert the butadiene in the cracked gases to furan as described previously. The cracking operation with this apparatus must be intermittent because much carbon forms on the catalyst. After about 15 minutes of operation the cracking column is purged with nitrogen and the carbon is then burned off of the catalyst in a stream of air. During the burning the temperature is controlled so as not to exceed about 650° C., since the catalyst loses activity at higher temperatures.

Example 3

Using the apparatus of Figure 2, 400 parts by volume of butane were passed per minute through 51 parts by volume of 15% chrome alumina catalyst bed at 600° C. The cracked butane stream contained 5% of 1,3-butadiene, 10% CO, 10% $CH_4$, 5% 2-butene and minor amounts of $CO_2$, ethylene, propene and isobutene, the remainder being unchanged butane. The cracked gas stream was fed directly into the reactor column with 80 parts by volume of air per minute. A catalyst bed of 3 parts by volume of manganous molybdate catalyst maintained at 540° C. was used to convert the butadiene to furan. A significant amount of furan was formed.

Example 4

Example 3 was repeated, but using 60 parts by volume of air per minute and 7.2 parts by volume of manganous molybdate catalyst maintained at 520° C. The yield of furan was somewhat improved.

The manganous molybdate catalyst used in the above examples can be prepared by adding an aqueous ammonium molybdate solution, brought to pH 7–8.5 with ammonia, to a solution of manganese (II) nitrate. More ammonia is added to neutralize the resulting slurry, which is filtered, and the recovered manganeous molybdate is washed, dried and ground to a suitable fineness for the desired space-velocity flow.

The invention provides a process for preparing furan from readily available and relatively inexpensive hydrocarbons. Therefore, the process offers obvious advantages over the previous preparation of furan from furfural.

Furan is readily hydrogenated to tetrahydrofuran, which is useful as a unique solvent and as an intermediate in the preparation of nylon textile fibers and other materials. Furan is also used as a pharmaceutical intermediate.

Since many different embodiments of the invention may be made without departing from the spirit and scope thereof, it is to be understood that the invention is not limited by the specific illustrations except to the extent defined in the following claims.

I claim:

1. The process for producing furan which comprises reacting 1,3-butadiene with oxygen at a temperature of 250°–550° C. in the presence of a catalyst comprising metallic (VI) oxide of a metal of group VI of the periodic system.

2. The process for producing furan which comprises reacting 1,3-butadiene with oxygen at a temperature of 250°–550° C. in the presence of a catalyst consisting of $MoO_3$ combined with up to 1 equivalent of $MnO$.

3. The process for producing furan which comprises reacting 1,3-butadiene with oxygen at a temperature of 250°–550° C. in the presence of manganous molybdate catalyst.

4. The process for producing furan which comprises contacting a mixture of gas containing 1,3-butadiene and oxygen with manganous molybdate catalyst at a temperature of 250°–550° C. to convert the butadiene to furan.

5. The process for producing furan which comprises passing a mixture of gas containing air and 1,3-butadiene in a ratio between 24:1 and 1:1 through a catalyst bed comprising manganous molybdate at a space velocity of 150 to 85,000 parts by volume of gas per hour per part by volume of catalyst space at a temperature of 250°–550° C. to convert the butadiene to furan.

6. The process defined in claim 5 wherein said mixture is a mixture of air and cracked butane products containing 1,3-butadiene.

7. The process for producing furan which comprises passing a mixture of gas containing air and 1,3-butadiene in a ratio of 5:1 to 12:1 through a catalyst bed comprising manganous molybdate maintained at 300°–400° C., said mixture being passed through the catalyst bed at a space velocity of 150–450 hours$^{-1}$.

No references cited.